United States Patent [19]
Michael et al.

[11] Patent Number: 5,704,839
[45] Date of Patent: Jan. 6, 1998

[54] ELASTOMERIC TORSIONAL DRIVE COUPLING WITH SECONDARY DAMPING ELEMENT

[75] Inventors: Robert J. Michael; Andrew B. Swoyer, Jr., both of Erie; Wallace C. Flower, McKean, all of Pa.

[73] Assignee: Lord Corporation, Cary, N.C.

[21] Appl. No.: 593,102

[22] Filed: Jan. 30, 1996

[51] Int. Cl.[6] .................................................. F16D 3/72
[52] U.S. Cl. ............................................................ 464/89
[58] Field of Search ........................... 464/81, 85, 87, 464/89, 91; 74/574

[56] References Cited

U.S. PATENT DOCUMENTS

| | | | |
|---|---|---|---|
| 2,029,796 | 2/1936 | Salomon | 74/574 |
| 2,041,507 | 5/1936 | Zeder | 74/574 X |
| 2,671,488 | 3/1954 | Christensen | 464/89 X |
| 2,873,010 | 2/1959 | Alma | 192/88 |
| 3,107,766 | 10/1963 | Pritchard | 192/89 |
| 3,425,528 | 2/1969 | Perruca | 192/70.27 |
| 3,446,430 | 5/1969 | Elmer | 230/271 |
| 3,557,573 | 1/1971 | Hansgen | 464/91 X |
| 4,083,265 | 4/1978 | Bremer | 74/574 |
| 4,406,640 | 9/1983 | Franlin et al. | 464/91 |
| 4,487,592 | 12/1984 | Strader | 464/88 |
| 4,693,354 | 9/1987 | Umeyama et al. | 192/106.1 |
| 4,781,659 | 11/1988 | Gebhardt | 74/574 X |
| 4,787,878 | 11/1988 | Nikkel | 464/83 |
| 4,794,816 | 1/1989 | Serizawa et al. | 74/574 |
| 4,815,332 | 3/1989 | Serizawa et al. | 74/574 X |
| 4,881,426 | 11/1989 | Serizawa et al. | 74/574 |
| 5,042,632 | 8/1991 | Jäckel | 192/106.2 |
| 5,181,736 | 1/1993 | Kokubun | 280/719 |
| 5,245,889 | 9/1993 | Kohno et al. | 74/574 X |
| 5,474,499 | 12/1995 | Olson | 464/83 |

*Primary Examiner*—Daniel P. Stodola
*Assistant Examiner*—Gregory J. Strimbu
*Attorney, Agent, or Firm*—Richard K. Thomson; Randall S. Wayland; James W. Wright

[57] ABSTRACT

An auxiliary torsional damper of the surface-effect type capable of damping torsional spikes which may occur during operational transition through the system's resonance frequency. Preferably, the auxiliary damper will be designed with a decoupling feature such that the damper will only provide auxiliary torsional damping for torsional oscillations which surpass a threshold amplitude. Since the surface-effect damper is deflection dependent, the larger the magnitude of the torsional spike, the larger the damping that will be applied thereto.

20 Claims, 6 Drawing Sheets

ELASTOMERIC TORSIONAL DRIVE COUPLING WITH SECONDARY DAMPING ELEMENT

BACKGROUND AND SUMMARY OF THE INVENTION

The present invention is directed to a torsional coupling. More particularly, this invention is directed to a torsional coupling which includes an auxiliary displacement-dependent damping element, that is, an element whose damping increases with the amplitude of the torsional displacement independent of velocity.

The assignee of the present invention has developed a line of power train drive couplings which are designed to damp vibration transmission between the drive elements and the driven elements. Applications include internal-combustion engine-driven-mobile-equipment power trains such as agricultural tractors, construction equipment, and automotive applications such as a crankshaft pulley which drives various pieces of equipment (e.g., a power steering pump, a water pump, an air conditioning compressor). These couplings comprise bonded or fictional elastomeric elements designed to transmit the torque from a drive to a driven element without transmitting the vibrations across the coupling.

Certain applications can produce torsional spikes, at system resonance, for example, that can defeat the primary damping element resulting in slippage of the coupling, transmission of high levels of low frequency vibration and, in some cases, damage to the primary damper. It is a feature of the present invention to provide a secondary or auxiliary damper capable of providing auxiliary damping to cope with the torsional peaks. This auxiliary damper provides damping which is deflection dependent and velocity independent, through a path that is parallel to the primary damper.

In a first embodiment, the auxiliary damper comprises an annular member affixed to one of the drive and driven members, the annular member having an elastomeric layer bonded thereto, and a substantially flat plate affixed to the other of said drive and driven members, the plate having a plurality of preferably elliptical protrusions formed on a surface which engage the elastomeric layer to produce surface-effect damping: a combination of frictional and hysteretic damping. The magnitude of this surface-effect damping can be adjusted by altering the relative positions of the two surfaces. Linear surface-effect damping devices and mounts are described and claimed in commonly assigned U.S. Pat. Nos. 5,183,137 and 5,257,680, with '137 disclosing a dual-rate linear damper. Rotary surface-effect dampers in shock isolating casters are described and claimed in U.S. Pat. No. 5,394,589. Finally, an adjustable, lockable damper employing surface-effect damping along an arcuate path is set forth in U.S. Pat. No. 5,486,056.

A second generally planar embodiment provides means to decouple the auxiliary damping until a threshold torsional amplitude is reached, the decoupler comprising a plurality of spool-shaped elements (the protrusions) oscillating in arcuate slots which are parallel to the circumference. Low amplitude relative movement produces no appreciable auxiliary damping, the elastomeric layer simply moving the spool-shaped decoupler elements back and forth in their slots. When the magnitude of the vibration exceeds the slot length as a result of a torsional peak, the auxiliary damper is activated damping these large amplitude torsional vibrations.

A third embodiment of the auxiliary damper employs a rigid annular surface having a portion which is at least semi-cylindrical and has a plurality of protrusions formed thereon. More preferably the rigid surface is fully cylindrical. A similarly shaped elastomeric layer has similarly shaped, albeit, differently dimensioned, protrusions which can engage the protrusions on the rigid surface. The differences in the dimensions of the rigid and elastomeric protrusions provide the decoupling such that the auxiliary damper will not function until a threshold torsional vibrational amplitude is reached. Preferably, the rigid surface has protrusions formed on both sides (i.e., the protrusions are pressed into the sheet metal) and a second protrusion ed elastomeric layer engages the opposite surface. This provides a simple way to effectively double the damping force available.

The protrusions of the two elastomeric layers may be sized and positioned to provide simultaneous engagement to provide a single displacement-dependent damping force or, alternatively, staggered engagement to provide dual-rate damping having a significant increase in damping force when the second set of protrusions are engaged.

Various other features, advantages and characteristics of the present invention will become apparent after a reading of the following specification.

BRIEF DESCRIPTION OF THE DRAWINGS

The preferred embodiments of the present invention are described in accordance with the following figures, like elements bearing like reference numerals, in which.

DETAILED DESCRIPTION OF THE PREFERRED EMBODIMENTS

Figure 1:
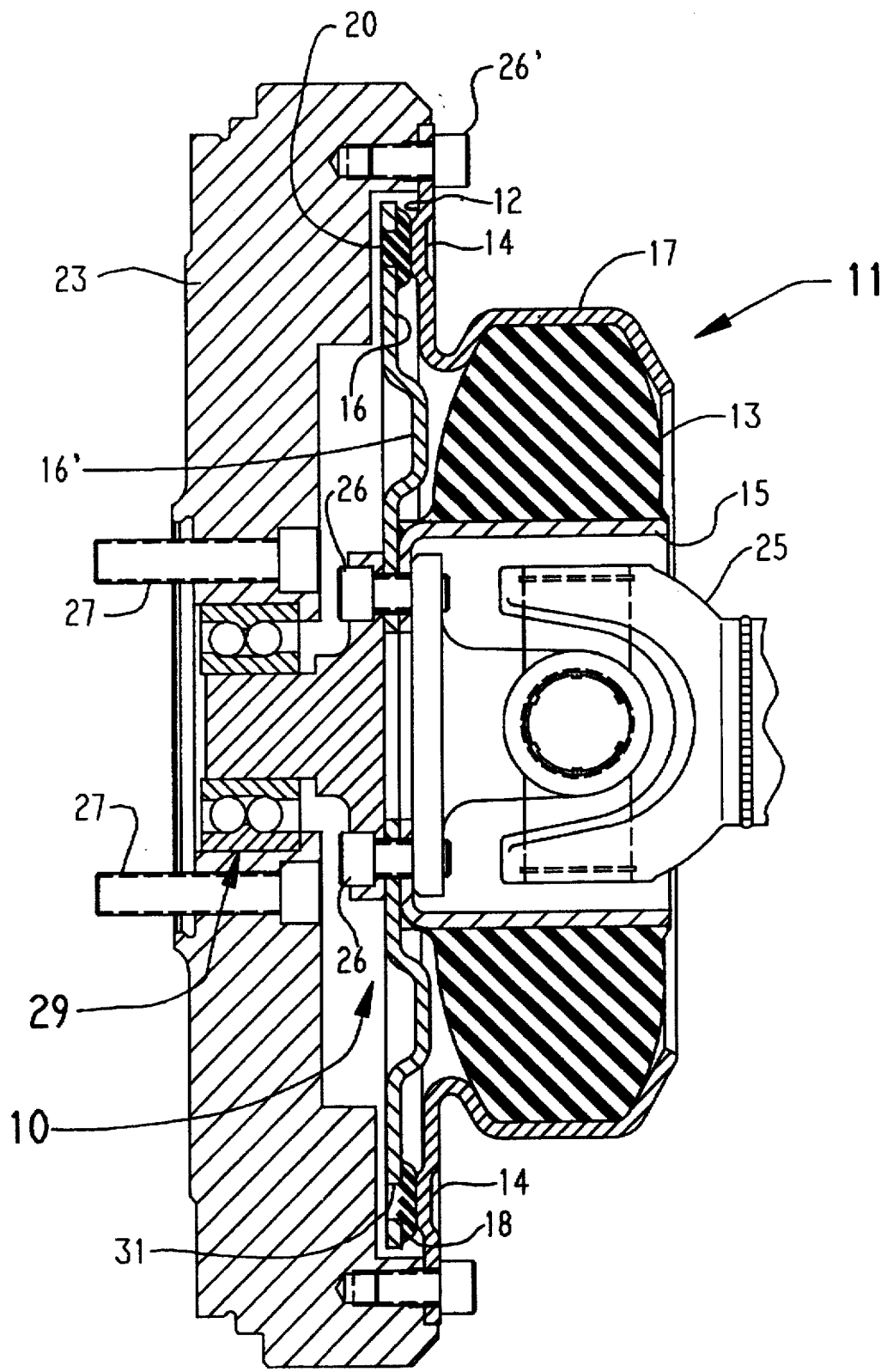
FIG. 1 is a cross-sectional side view of a fictional coupling using a first embodiment of the auxiliary damper of the present invention.

A first embodiment of the auxiliary damper of the present invention is depicted in FIG. 1 generally at 10. As shown there, auxiliary damper 10 is used with a primary damper/coupling 11 through which drive torque is transmitted from first drive element 23 to second driven element 25. Elastomeric portion 13 of primary damper 11 is bonded to hub 15 and is frictionally driven by annular collar 17 which encircles the periphery of elastomeric portion 13. Hub 15 is bolted to driven element 25 by bolts 26 while annular collar 17 is bolted to drive member 23 by bolts 26'. As depicted in FIG. 1, drive member 23 is a fly wheel which is attached to a drive shaft by bolts 27. In other applications, drive member 23 could take an alternate form such as a drive pulley, for example. Center bearing 29 is provided between drive (23) and driven (25) elements for alignment and stability purposes.

Figure 2:
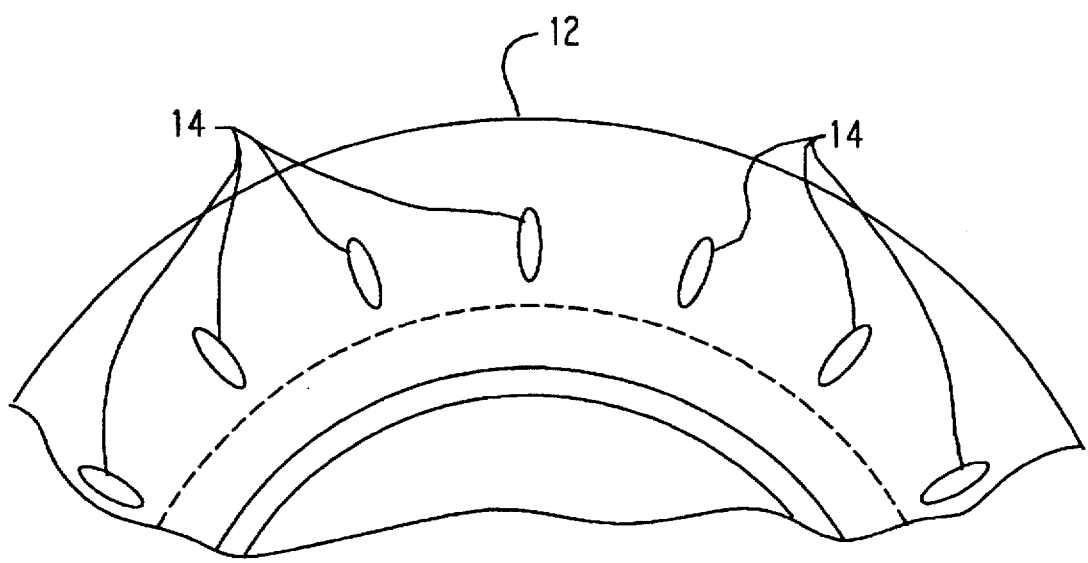
FIG. 2 is a partial frontal view of a portion of the auxiliary damper of the present invention.

Auxiliary or secondary damper 10 comprises an annular, generally planar, rigid surface 12 secured to drive element 23. In this embodiment, rigid surface 12 is a radially extending portion of collar 17. A second rigid surface 16 on plate 16' is juxtaposed to first rigid surface 12 and is bolted to driven element 25 by bolts 26. An annular elastomeric layer 18 is bonded to the face of surface 16. A plurality of projections 20 extend from the plate-side of elastomeric layer 18 (i.e., the side-facing place 16') and are received in openings 31 in rigid surface 16 to enhance the bond. First rigid surface 12 is provided with a plurality of preferably elliptical protrusions 14 (FIG. 2) which engage elastomeric layer 18. Should there be any relative torsional movement between drive (23) and driven (25) elements and, hence, between collar 17 and hub 15, in addition to the primary damping occurring in elastomeric portion 13, a surface-effect damping in which both frictional and hysteretic damping take place as elliptical protrusions 14 engage and work the elastomeric layer 18 will be provided by auxiliary damper 10. The magnitude of this auxiliary damping can be adjusted by adjusting the relative positions of rigid surfaces 12 and 16. While this could be done by simply adjusting the tightness of bolts 26, it would most preferably be done by using washers between hub 15 and surface 16. Should elastomeric washers be employed, greater flexibility in the adjustment capabilities of tightening bolts 26 could be provided.

Table 1 depicts data gathered from testing a coupling (primary damper) 11 with and without the auxiliary damper 10. The elastomer used in the prototype auxiliary damper which was tested was a polybutadiene. Future production samples may use this formulation or, alternatively, may be made of an abrasion-resistant nitrile robber.

typical hydraulic damper which is essentially flat for changing amplitude. FIG. 3B, on the other hand, demonstrates that the surface-effect damper (curve C) demonstrates flat performance for changing frequency, while the conventional hydraulic damper varies significantly with frequency (curve D). Curves C and D are for low amplitude vibrations (±1 mm) and to correct the improper inference that hydraulic dampers are more effective than surface-effect dampers, Curves E and F demonstrate that for larger amplitude vibrations (±2 mm), SE dampers begin to show their superior damping capabilities.

Figure 4A:
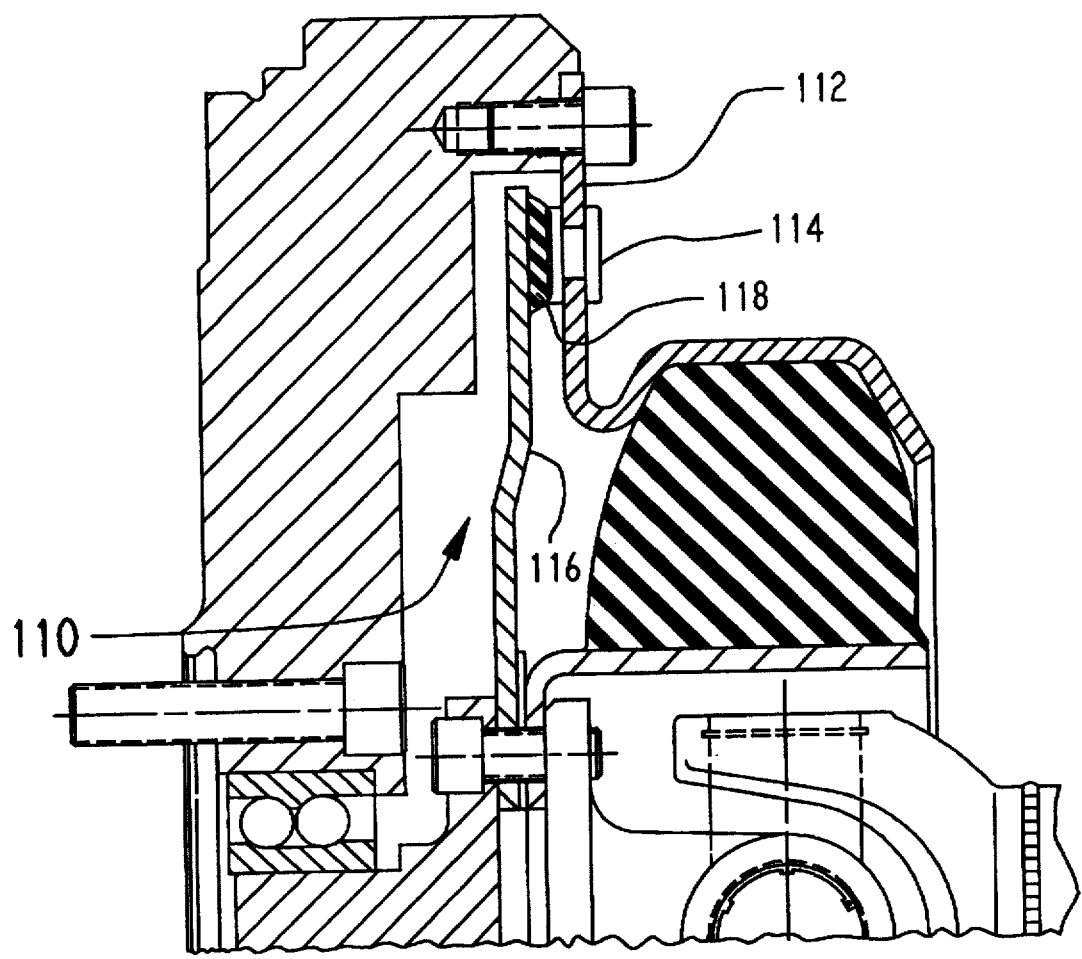
FIG. 4A is a cross-sectional side view of a second embodiment of the auxiliary damper of the present invention.
Figure 4B:
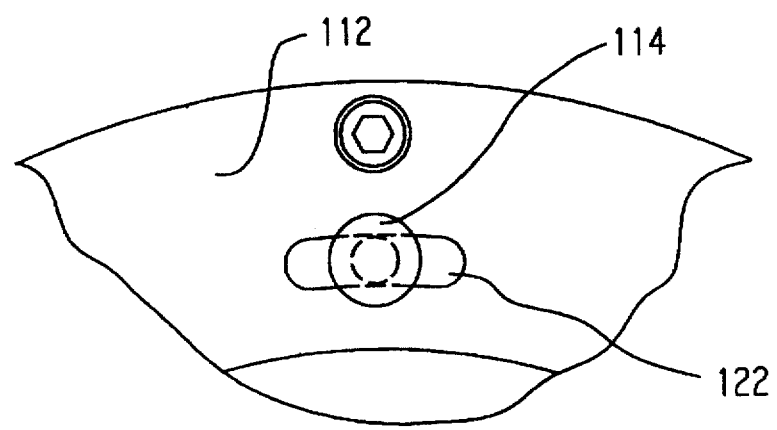
FIG. 4B is a frontal detail view of a spool-shaped element received in a decoupling slot.

For most applications, it would be preferable to have a decoupling feature on the auxiliary damper, that is, for the primary damper to work independently until a threshold torsional vibrational amplitude is reached. This would provide more flexibility in design and save wear and tear on the auxiliary damper until the auxiliary damping is needed to save wear and tear on the primary damper. A second embodiment of the auxiliary damper of the present invention which includes decoupling is shown in FIG. 4 generally at 110. Protrusions 114 are formed as a plurality of spool-shaped members (preferably between 8 and 12, in number) which are free to translate in circumferentially oriented slots 122 (FIG. 4B) in rigid surface 112. Spool-shaped protrusions 114 engage elastomeric layer 118 on surface 116 and, in the case of low amplitude torsional vibrations, will simply oscillate freely in slots 122 resulting in no appreciable auxiliary damping (i.e., no appreciable frictional or hysteretic engagement). When the magnitude on the torsional vibration reaches a particular threshold amplitude, the protrusions 114 will frictionally and hysteretically work the rubber of layer 118 damping these large amplitude torsional vibrations. Such torsional spikes may occur when the drive element 23 is operating in the region of the natural frequency of the system resulting in resonance.

TABLE 1

| | | | Without Surface Effect Damping | | | | With Surface Effect Damping | | | | |
|---|---|---|---|---|---|---|---|---|---|---|---|
| Test Block | Ampl. (*) | Freq. (Hz) | K* (lb-in/rad) | eta | Loop Area (lb-in) | Dissipation (watts) | K* (lb-in/rad) | eta | Fric. Torq. (lb-in) | Loop Area (lb-in) | Dissipation (watts) |
| 0 | 0 ± 10 | 5 | 20600 | .069 | 135.0 | 76.2 | 21100 | .069 | 825 | 797.7 | 450.6 |
| 1 | 0 ± 5 | 5 | 21900 | .076 | 36.9 | 20.8 | 22600 | .076 | 750 | 347.1 | 196.1 |
| 2 | 0 ± 5 | 10 | 22000 | .095 | 46.2 | 52.2 | 24500 | .095 | 850 | 397.4 | 449.0 |
| 3 | 0 ± 2 | 10 | 23900 | .076 | 7.0 | 7.9 | 31200 | .076 | 700 | 124.2 | 140.3 |
| 4 | 20 ± 10 | 5 | 17300 | .083 | 138.0 | 78.0 | 23000 | .083 | 800 | 848.8 | 479.5 |

By examining the data from test blocks 0 and 1 vs 1 and 2, the displacement dependency, frequency-independent nature of the coupling can be observed. Where K* is the complex torsional spring rate and eta is the loss factor, loop area, (actually hysteresis loop area) given here in units of lb-in, is deemed the best measure of damping effectiveness. Hysteresis loop area is a measure of energy removed from the system. Looking first at the hysteresis loop area for the latter pair, test blocks 1 and 2 demonstrate that for constant amplitude, varying frequency, damping is substantially constant. The earlier pair, blocks 0 and 1, demonstrate that for constant frequency, varying amplitude, hysteresis loop area effectively doubles for the doubled amplitude.

Figure 3A:
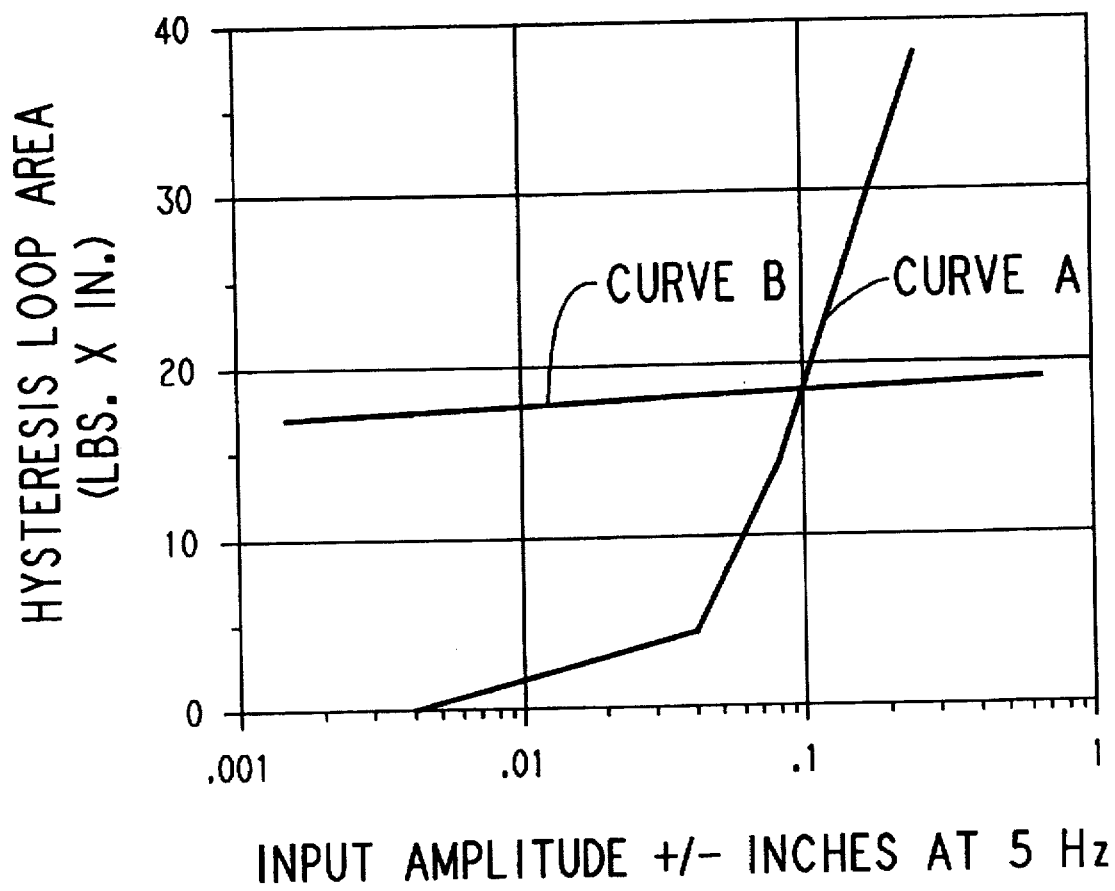
FIG. 3A is a plot comparing damping characteristics of a linear surface-effect damper to a hydraulic damper at constant frequency for varying amplitude.
Figure 3B:
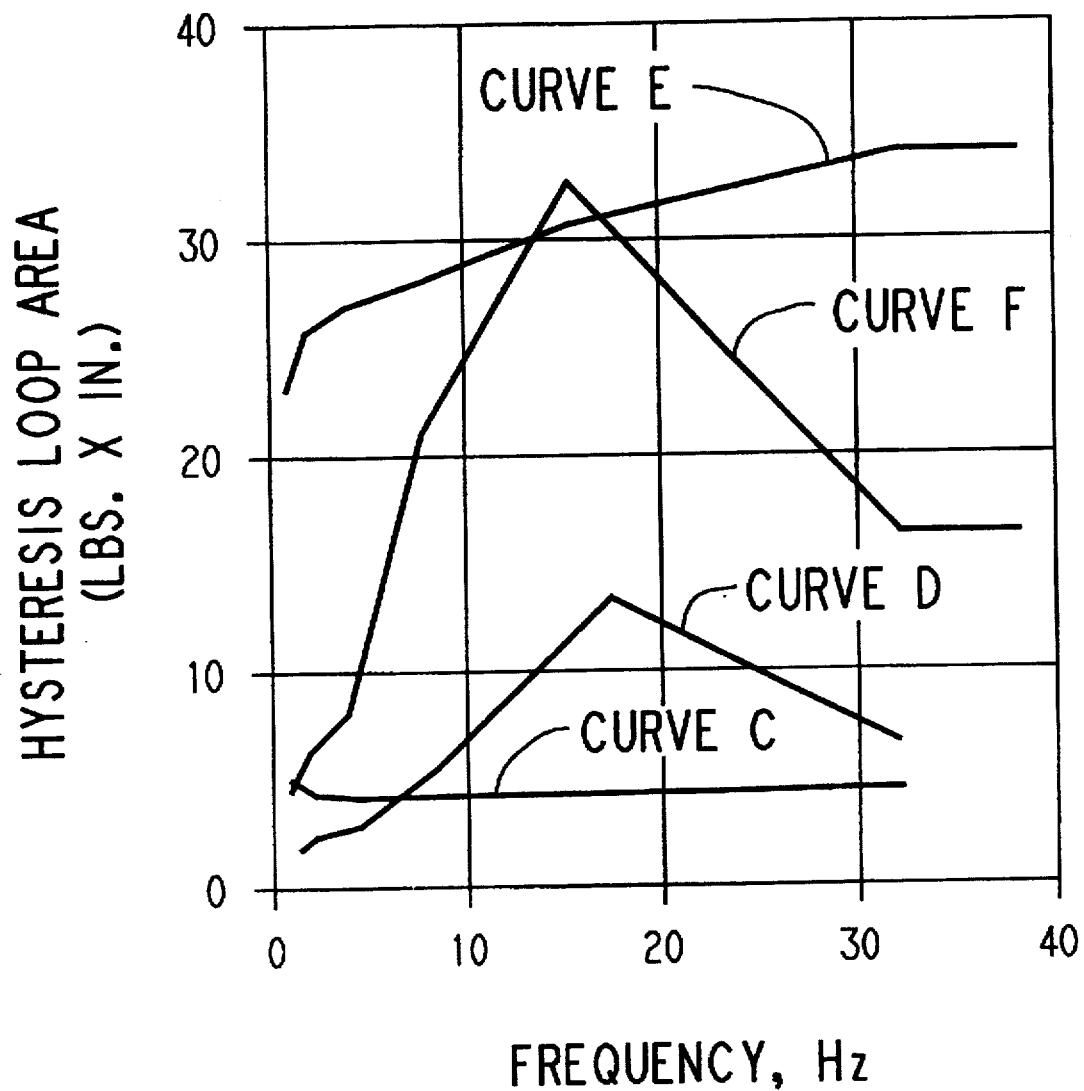
FIG. 3B is a plot similar to FIG. 3A for constant amplitude varying frequency.
Figure 5:
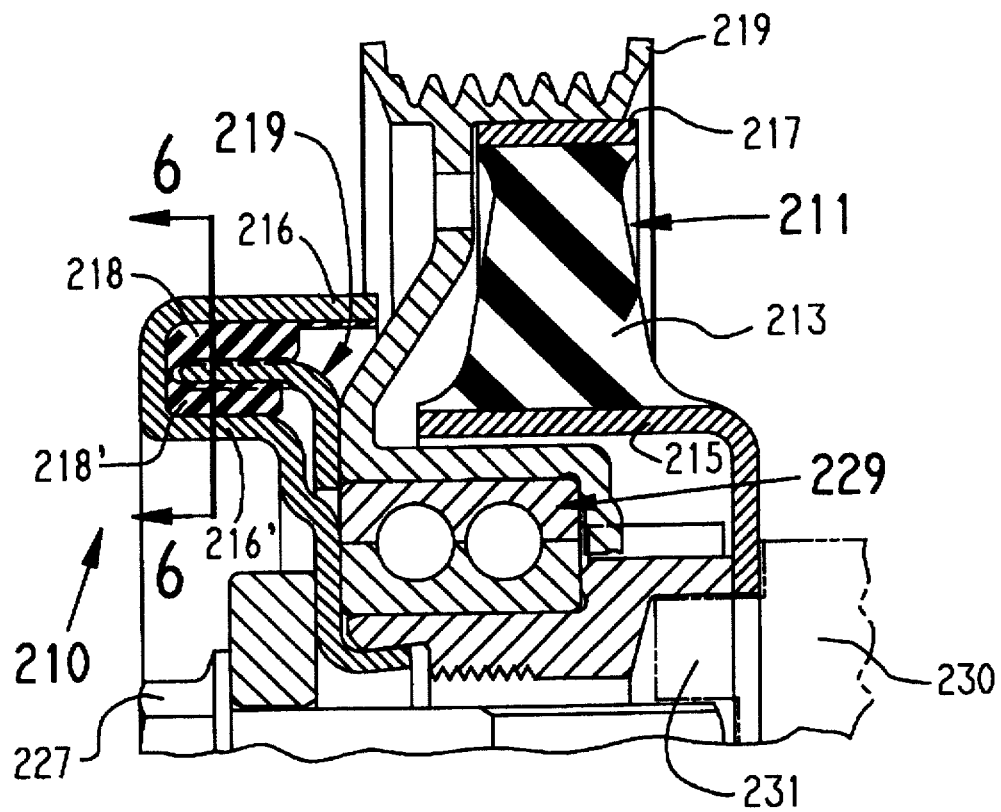
FIG. 5 is a partial cross-sectional side view of a third embodiment of the present invention; and, FIG. 6 is a cross-sectional end view as seen along line 6—6 of FIG. 5.
Figure 6:
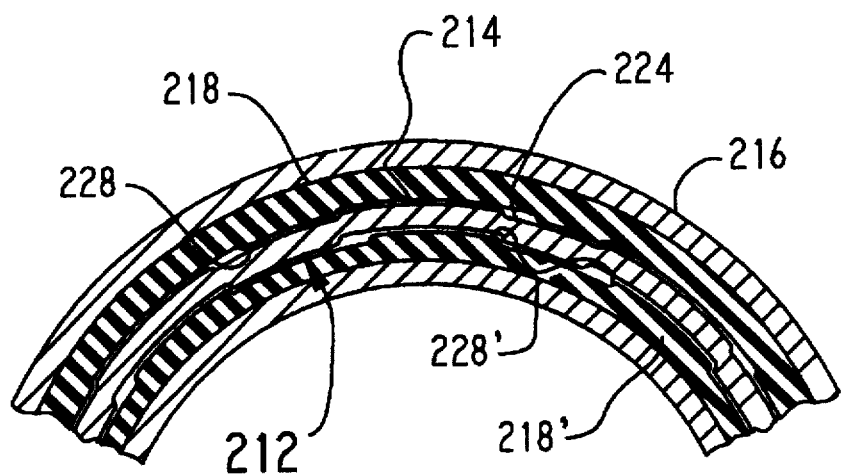

FIGS. 3A and 3B depict the damping characteristics for linear surface-effect (SE) dampers; torsional dampers have these same characteristics, although the hysteresis loop area for torsional dampers will typically be an order of magnitude greater than the values shown in the graph. In FIG. 3A, curve A shows that the damping available in the surface-effect damper increases with amplitude, i.e., its damping is displacement dependent. Contrast this with curve B for a A third embodiment is depicted in FIGS. 5 and 6 generally at 210. In this embodiment, the elastomer portion 213 of primary damper 211 is fully bonded to both hub 215 and collar element 217. Collar element 217, in this embodiment, is press fit into a crankshaft pulley 219 which drives a main serpentine belt (not shown). Pulley 219 is connected to the crankshaft 230 by bolt 227 and may drive such equipment as a power steering pump, water pump, alternator, air conditioning compressor, etc., through the serpentine belt. In this embodiment, the inner hub 215 is attached to the crankshaft 280 by bolt 227. Bolt 227 threads directly into pilot 231 of crankshaft 230 clamping pulley 219 and inner hub 215 to crankshaft 230. A vibrational spike has occurred when the steering wheel is turned fully to the right or left resulting in a vibrational input from the power steering pump to the other pieces of equipment through the serpentine belt producing slippage of the belt and a high-pitched squeal. The auxiliary damper 210 of the present invention will dampen the torsional spike and eliminate the squeal.

First rigid, protrusion-bearing surface (rigid surface, for short) 212 is annular and is attached to outer element 219 as by welding, or the like, and second rigid, elastomer-layer-bearing rigid surface 216 is attached for movement with said hub 215 as for example, by clamping it using bolt 227. Surface member 212 is preferably, at a minimum, semi-cylindrical and, most preferably, fully cylindrical. Rigid surface 212 has a plurality of protrusions 214 extending upwardly from a base diameter 224 and most preferably, protrusions 214 are formed by pushing a sheet metal portion to form corresponding vacancies on the back side of protrusions 214 for reasons to be discussed below.

Elastomeric layer 218 has a plurality of protrusions 228 formed on its nonbonded surface. Protrusions 228 are shaped similarly to protrusions 214 but have smaller circumferential dimensions than the spaces between protrusions 214. This variation in extent provides the desired decoupling by allowing protrusions 214 to move freely between protrusions 228 for low frequency torsional oscillations. As in the previous embodiments, bearing 229 provides alignment and stability, while providing the capacity for relative movement between hub 215 and pulley 219 so that drive is accomplished through primary damper 211.

It is preferred that the element forming rigid surface 216 wrap around member 212 forming a secondary rigid support surface 216' which supports a secondary elastomeric layer 218'. While rigid surfaces 216 and 216' could be formed by separate, interconnected elements, by interconnecting these two lateral surfaces by a radially extending flange portion, the members are made to move together and optimum performance is assured. First (218) and second (218') elastomeric layers are bonded to surfaces 216 and 216', respectively and sandwich rigid surface 212. The protrusions 214 in the radially extending portion of surface member 212 are formed by displacing (dimpling) the radially extending portion of surface member 212 radially outwardly from a base diameter portion 224 (FIG. 6). Since the member forming surface 212 is a stamping, the opposite side of protrusions 214 form a base diameter from which the nether side of base diameter portion 224 form protrusions.

Second elastomeric layer 218' also has protrusions 228' formed thereon. It is preferred that protrusions 228' be positioned and sized to engage the protrusions on the opposite side of rigid surface 212 simultaneously with the engagement of protrusions 228 with protrusions 214. Alternatively, protrusions 228' could be sized and positioned to engage either before or after protrusions 228 to provide a dual-stage or stepped, surface-effect damping. It will be recalled that this auxiliary damper is displacement dependent; it will therefore greatly simplify providing the desired design parameters to have simultaneous engagement of the protrusions 228 and 228'.

The present invention provides an auxiliary torsional damper of the surface-effect type capable of damping torsional spikes which may occur during operational transition through the system's resonance frequency. Preferably, the auxiliary damper will be designed with a decoupling feature such that the damper will only provide auxiliary torsional damping for torsional oscillations which surpass a threshold amplitude. Since the surface-effect damper of the present invention is deflection dependent, the larger the magnitude of the torsional spike, the larger the damping that will be applied thereto.

Various changes, alternatives and modifications will become apparent to a person of ordinary skill in the art after a reading of the foregoing specification. It is intended that all such changes, alternatives and modifications as come within the scope of the appended claims be considered part of the present invention.

What is claimed is:

1. In a torsional damping system having an elastomeric primary damping element through which drive torque is transmitted between an outer first member and an inner second member, a secondary damping element for producing an auxiliary damping force for large amplitude torsional vibrations, said auxiliary damping force being transmitted between said first and second members along a path which is parallel to and axially offset from a path through said primary damping element, said secondary damping element comprising
   a) a first rigid surface portion fixedly attached to, for movement with, said first member;
   b) a second rigid surface portion fixedly attached to, for movement with, said second member;
   c) a first elastomeric layer bonded to only one of said first and second rigid surface portions;
   d) protrusions formed only on the other of said first second rigid surface portions and adapted to engage said elastomeric layer;
whereby when said first member experiences sufficient relative rotation with respect to said second member resulting from a large amplitude torsional vibration, engagement between said protrusions and said first elastomeric layer will frictionally and hysteretically damp said relative rotation.

2. The secondary damping element of claim 1 wherein a magnitude of said damping of relative rotation is independent of velocity and is proportional to a magnitude of said relative rotation.

3. The secondary damping element of claim 1 further comprising decoupler means to minimize frictional and hysteretic damping between said protrusions and said elastomeric layer until said relative rotation reaches a particular threshold value.

4. The secondary damping element of claim 3 wherein said rigid surface to which said elastomeric layer is bonded is annular and planar.

5. The secondary damping element of claim 4 wherein said other rigid surface is annular and planar, said other planar surface extending radially from a central axis of said first and second members.

6. The secondary damping element of claim 5 wherein said protrusions comprise a plurality of spool shaped members and said decoupler means comprise a like plurality of arcuate slots which are parallel to a circumference of said annular other rigid surface, said spool shaped members moving freely in said slots for low amplitude vibrations thereby minimizing said secondary damping force.

7. The secondary damping element of claim 3 wherein said decoupler means comprise a first and a second plurality of protrusions extending from a first base diameter to a second larger diameter formed upon i) a first side of said other of said first and second rigid surface and ii) said elastomeric layer, respectively, said first and second rigid surface portions each being at least semi-cylindrical and said first and second plurality of protrusions having differing circumferential extents.

8. The secondary damping element of claim 7 wherein said first and second rigid surface portions are fully cylindrical.

9. The secondary damping element of claim 7 wherein said one of said first and second rigid surface portions wraps around said other of said first and second rigid surface portions and supports a second elastomeric layer which has additional protrusions which are engaged by protrusions on a side of said other of said first and second rigid surface portions opposite said first side.

10. The secondary damping element of claim 9 wherein the protrusions on said first elastomeric layer and said second elastomeric layer are sized and spaced to simultaneously engage said protrusions on said other of said first and second rigid surface portions.

11. The secondary damping element of claim 9 wherein the protrusions on one of said first and second elastomeric layers engage the protrusions on one of said first side and said opposite side of said other of said first and second rigid surface portions prior to engagement by said protrusions on the other of said first and second elastomeric layers with said protrusions on the other of said first side and said opposite side of said other of with first and second rigid surface portions, whereby said resulting damping has a graduated increase in magnitude.

12. The secondary damping element of claim 9 wherein said protrusions on said opposite side of said other of said first and second rigid surface portions extend from said first base diameter to a smaller protrusion diameter.

13. The secondary damping element of claim 1 wherein said rigid surface to which said elastomeric layer is bonded is annular and planar.

14. The secondary damping element of claim 13 wherein said other rigid surface is annular and planar, said other rigid planar surface extending radially from a central axis of said first and second members.

15. The secondary damping element of claim 14 wherein each of said protrusions is generally elliptical being stamped into said other surface by pushing a dimple in an opposite face thereof.

16. The secondary damping element of claim 15 further comprising means for adjusting said secondary damping force by altering relative spacing between said first and second surfaces.

17. The secondary damping element of claim 1 wherein said other of said first and second rigid surface portions is annular and has a cylindrical portion extending axially along and about a central axis of said first and second members.

18. The secondary damping element of claim 17 wherein said one of said first and second rigid surface portions is annular and has a primary cylindrical portion extending axially along and about said central axis of said first and second members coaxially with said cylindrical portion of said other of said first and second rigid surface portions.

19. The secondary damping element of claim 18 wherein said one of said first and second rigid surface portions has a secondary portion which is cylindrical, extends axially along and about said central axis coaxially with each of said first and second rigid surface portions and faces a side of said other of said first and second rigid surface portions opposite to a side of said other of said first and second rigid surface portions facing said primary cylindrical portion, whereby said elastomeric layer, bonded to said primary and secondary cylindrical portions of said one of said first and second rigid surface portions effectively sandwiches said other rigid surface portions.

20. The secondary damping element of claim 19 wherein said primary and secondary cylindrically-extending portions of said one of said first and second rigid surface portions are interconnected by a radially extending portion of limited extent.

* * * * *